United States Patent [19]

Andersson

[11] Patent Number: 5,667,745
[45] Date of Patent: Sep. 16, 1997

[54] METHOD FOR THE INTEGRAL MOLDING OF A SYNTHETIC THERMOPLASTICS PART

[75] Inventor: Par Andersson, Lutry, Switzerland

[73] Assignee: Tetra Laval Holdings & Finance S.A., Pully, Germany

[21] Appl. No.: 146,942

[22] Filed: Nov. 1, 1993

Related U.S. Application Data

[63] Continuation of Ser. No. 893,909, Jun. 4, 1992, abandoned, which is a continuation of Ser. No. 532,957, Jun. 4, 1990, abandoned.

[30] Foreign Application Priority Data

Jun. 13, 1989 [CH] Switzerland ............... 2226/89

[51] Int. Cl.$^6$ .................. B29C 45/04; B29C 45/10; B29C 45/14
[52] U.S. Cl. ............. 264/275; 264/259; 264/328.7
[58] Field of Search ............... 264/250, 252, 264/259, 266, 267, 268, 294, 296, 328.7, 328.11, 328.12, 275; 425/116, 129.1, 125

[56] References Cited

U.S. PATENT DOCUMENTS

| | | | |
|---|---|---|---|
| 3,632,729 | 1/1972 | Bielfeldt | 264/328.7 |
| 3,988,413 | 10/1976 | Gaudet et al. | 264/259 |
| 3,996,329 | 12/1976 | Holland et al. | 264/296 |
| 4,013,392 | 3/1977 | Smith . | |
| 4,357,294 | 11/1982 | Hetherington et al. | 264/294 |
| 4,707,321 | 11/1987 | Segawa et al. | 264/294 |
| 4,725,213 | 2/1988 | Reil et al. . | |
| 4,781,012 | 11/1988 | Reil et al. . | |
| 4,834,638 | 5/1989 | Miyahara et al. | 425/116 |

FOREIGN PATENT DOCUMENTS

| | | |
|---|---|---|
| A6913987 | 9/1987 | Australia . |
| B580703 | 1/1989 | Australia . |
| A391098 | 10/1990 | European Pat. Off. . |
| A2228591 | 12/1974 | France . |
| C887263 | 8/1953 | Germany . |
| A2421364 | 11/1974 | Germany . |
| A3606280 | 9/1987 | Germany . |
| A3911246 | 10/1990 | Germany . |
| 50-032256 | 3/1975 | Japan . |
| 060624 | 3/1987 | Japan . |
| 62-201223 | 9/1987 | Japan . |
| 135221 | 6/1988 | Japan . |
| A2286310 | 11/1990 | Japan . |
| C583622 | 1/1977 | Switzerland . |
| 1460291 | 12/1976 | United Kingdom . |

OTHER PUBLICATIONS

Foreign Search Report (May 28, 1991).

*Primary Examiner*—Angela Oritz
*Attorney, Agent, or Firm*—Paul & Paul

[57] ABSTRACT

A method for the integral molding of a thermoplastics top on the edge of a cardboard tube, the plasticized synthetic plastics material being injected into the mold cavity formed by inner and outer mold parts, the mold parts being pressed against each other with force. To produce relatively thin plastics parts with a high degree of dimensional accuracy in the very shortest time and by using simpler tools, the mold cavity in a first stage is maintained at a large volume during which the plasticized synthetic plastics material at least partially fills the mold cavity under a relatively low pressure, the mold cavity being in a second stage conveyed to a smaller volume than that of the first stage, the clamping force for pressing together the inner and outer mold parts being increased in the second stage in relation to that in the first stage.

1 Claim, 5 Drawing Sheets

METHOD FOR THE INTEGRAL MOLDING OF A SYNTHETIC THERMOPLASTICS PART

CROSS-REFERENCED TO RELATED APPLICATIONS

This is a continuation of a continuation application U.S. Ser. No. 07/893,909 filed Jun. 4, 1992, now abandoned, of a prior application Ser. No. 532,957 filed Jun. 4, 1990, now abandoned, claiming foreign priority from Swiss Application #2 226/89-5 filed Jun. 13, 1989.

BACKGROUND OF THE INVENTION

1. Field of Invention

The invention relates to a method for the integral molding of a thermoplastics synthetic part on the rim of a thin-walled body consisting of paper, cardboard or the like, particularly the injection molding of a plastics top on the edge of a tube consisting of synthetic plastics coated paper, the plasticised synthetic material being injected into the mold chamber formed by inner and outer mold parts, the mold parts being pressed against one another with force.

The invention also relates to an apparatus for integral molding, there being formed between an inner mold part and an outer mold part a mold cavity which can be brought into engagement with the nozzle of an injection moulding unit with a plasticising cylinder and an extruder worm adapted for movement therein, means being provided for pressing together the mold parts.

2. Description of the Related Art

Such an integral molding process and a similar integral molding apparatus are known in the case of machines in which liquids packages are produced, preferably even filled, sealed and then carried away in a line. In the case of such package producing machines, a tube is produced from synthetic plastics coated paper, pushed onto the mandrel on a mandrel wheel and a synthetic plastics top is integrally molding on the open end of the mandrel. The injection molding arrangement is so constructed that the mandrel constitutes the inner mold part around which, and at a distance, engage two outer mold halves which thus form the outer mold part. By virtue of the gap between the inner mold part and the outer mold part, a mold cavity is created into which synthetic plastics material is injected from the nozzle of the injection molding unit.

Where the prior art injection molding equipment is concerned, granulate is fused on an extruder worm adapted for movement in a heated plasticising cylinder and the molten material is brought into the filling space in front of the tip of the extruder worm, from whence it is injected in a measured quantity into the mold cavity described. This injection of molten synthetic plastics material into the mold cavity takes place at very high forces by means of hydraulically driven cylinder-piston units.

Synthetic plastics tops on liquids packages are kept thin-walled and the access passages for the liquid synthetic plastics material have a restricted cross-section to produce a high flow resistance which brings about the aforesaid high molding pressures. With special machines, an injection molding pressure of 1000 bars is feasible. This high pressure is propagated from the injection molding passage into all parts of the mold cavity. By virtue of the property of the plasticity in the synthetic plastics material, this high pressure has a disadvantageous effect which extends into end parts of the mold cavity. Therefore, the inner and outer mold parts must be held together with considerable force. Closure forces of 1000 tonnes are nothing out of the ordinary with relatively large machines. Such high closure forces are applied in order to keep the mold cavity substantially constant.

More accurate measurements in the mold cavity of prior art machines have however shown that the pressure which acts outwardly form the synthetic plastics material in the mold cavity actually enlarges the mold cavity during operation, producing a certain deformation. Both the mountings of the inner mold part, e.g. of the mandrel in a mandrel wheel, and also the mountings of the outer mold halves which are pivotable about bearing shafts, are exposed to high forces and are displaced minimally in such directions that the mold cavity is enlarged.

Synthetic plastics tops on liquids packages often have opening means with lines of weakness which are intended to be torn open by the end user who wishes to open the package, but which must remain reliably liquid-tight until the first opening. It has been shown that the ratio of the wall thickness at the top to the thickness of line of weakness must be very exact and that the deformation of the mold cavity due to the aforesaid high forces does produce disadvantageous dimensional shifts. Attempts have already been made by pre-set pressures to arrive at the desired final dimension of the lines of weakness but in this case during production and in operation of the packaging machine, the tolerances known to a man skilled in the art are very important. Therefore, the entire injection molding system is very critical.

For example, what is very precisely important is the quantity of synthetic plastics material injected into the mold cavity because even very tiny increases in injection quantities can lead to considerable rises in pressure. The synthetic plastics material to be plasticised must therefore be injected in a very carefully measured form which is however critical due to tolerances in the proximity switches.

Furthermore, it has been found that in prior art package producing machines minimum times are needed to bring the inner mold part into the correct position, to close the outer mold halves, to inject the synthetic plastics material, to cool it and then to open the mold halves again. The times determined by the injection molding establish the clock times attainable for the machine as a whole, so that there is no way of utilizing time saved elsewhere on the machine.

For a satisfactory configuration of a synthetic plastics top, it is desirable for the injection port to be disposed in the region of the centre of the top so that the liquid synthetic plastics material can flow radially outwardly from the centre under substantially the same conditions. As long as the liquid synthetic plastics material is flowing through the central passage, heat is supplied do that during this time the middle area of the top cannot cool. It would therefore be highly desirable to be able to reduce the flow time necessary for movement of the synthetic plastics material.

SUMMARY OF THE INVENTION

Therefore, the invention is based on the problem of so improving the method of integrally molding a synthetic plastics part having the features mentioned at the outset and also of improving the described apparatus that thinner synthetic plastics parts can with greater dimensional accuracy be produced possibly in a shorter time and with simpler tools.

With regard to the method, this problem is according to the invention resolved in that in a first stage the mold cavity is maintained at large volume during which the plasticized synthetic material at least partially fills the mold cavity under low pressure and that in a second stage the mold cavity is brought to a smaller volume than that of the first stage, the clamping force for pressing together the inner and outer mold parts being increased in the second stage in comparison with that of the first stage. Actually, for the injection of the measured quantity of plasticised synthetic plastics material into the mold cavity, considerably lower injection pressures are required. Also from the tools aspect, in this first stage, during the injection of synthetic plastics material, lesser clamping forces are required since the volume of the mold cavity is maintained at an initial large volume which is reduced in the second stage of the method. In fact, if upon conclusion of the injection molding process the desired and measured quantity of plasticised synthetic plastics material is contained in the mold cavity, only then are the outer and inner mold parts moved together by a small amount to reduce the volume of the mold cavity, the clamping force for pressing the mold parts together in this second stage naturally being greater than that used in the first stage. The advantage provided by subsequent increasing of the clamping forces and the subsequent reduction in the mold cavity lies in that in the central area of the integrally molded synthetic plastics part the materials remains substantially at rest, movement occurring only at the outer marginal parts of spot of material, i.e. of the drop of plasticised synthetic plastics material. In contrast to the conventional injection molding process in which the pressure in the centre is at the greatest and at the least at the edge of the plasticised synthetic plastics drop, the situation according to the present invention is reversed. Since the flow speed of plasticised synthetic plastics material in the mold cavity is proportional to the pressure in the mold cavity at which inter alia also the mold parts are forced apart, there is in the central area of the synthetic plastics part which is to be integrally molded or of the drop of plasticised synthetics plastics material a low pressure while there is a high pressure at the edges of the drop. The synthetic plastics composition therefore moves more rapidly at the outer edge during the second stage of the method while virtually nothing moves in the centre.

Therefore, according to the invention, it is advantageous if the plasticised synthetic plastics material is injected centrally into the middle of the mold cavity. It is also advantageous if, during the course of the second stage, when there is an increase in the clamping force for pressing together the inner and outer mold parts, the pressure in the mold cavity increases from the centre outwards. For example, it has been found to be particularly advantageous if according to the invention the plasticised synthetic plastics material is in the first stage injected at a pressure of about 100 bars into the mold cavity which is maintained at a large volume, the clamping force for pressing together the inner and outer mold parts amounting to about 3 tonnes.

In the case of conventional methods, a clamping force of about 6 tonnes was required, synthetic plastics parts being produced with a material thickness of about 0.65 mm. The clock time needed for the integral molding of such synthetic plastics parts amounted to about 2.1 seconds, because also the plasticised synthetic plastics composition could only flow relatively slowly through the narrow flow passages, if one takes into account the fact that in the region of the lines of weakness, it is virtually impossible for flow to take place at the tear-open aperture of a liquids package.

By reason of the procedural measures according to the new invention, therefore, it is possible not only to reduce the clamping force to 3 tonnes but it is even possible to attain material thicknesses for the synthetic plastics part which is to be injection molded of only 0.5 mm with the favorable result of a considerable saving on material. At the same time, it has been demonstrated that by applying the new method it is also possible to reduce the clock time for the integral molding of synthetic plastics parts on the rim of the paper body to less than 1.8 seconds.

The present invention provides a method and apparatus for the integral molding of a synthetic thermoplastics part on the rim of a thin-walled body consisting of paper, cardboard or the like, particularly the molding of a synthetic plastics top on the rim of a tube consisting of synthetic plastics coated paper. Formed between an inner mold part and an outer mold part is a mold chamber which is adapted to be brought into engagement with the nozzle of an injection molding unit with a plasticising cylinder and an extruder worm adapted for movement therein. Means for pressing together the mold parts is also provided. The aforementioned problem according to the invention being resolved in that control devices for maintaining, reducing and enlarging the gap between outer and inner mold parts are disposed and being capable of operation by drive means, preferably the injection molding unit. With the novel teaching of the present invention, what is important is the variation in volume of the filling space which is why, when looking at the parts of the apparatus, the variation in the gap between outer and inner mold parts becomes essential. At the start of the first step of the method, this gap must be increased then maintained during the course of the first stage of the method and subsequently reduced. Here, the teaching according to the invention recommends control devices and drive means for the mold parts. Control devices may for example be shims as a means of limiting the thickness between the outer an inner mold parts. It is however also possible to think of a control device which is a drive by which the mounting of the inner mold is part displaced. Alternatively a control device is also available within the meaning of the invention if the pivot shafts of the outer mold parts are so displaceably mounted that during the transition between the first and second stages of the method there is a relative displacement in respect of the inner mold part. Therefore, all these measures and control operations serve to alter the gap between the outer and inner mold parts or which are capable of maintaining this gap for a certain time preferably during the first stage of the method when therefore the plasticised synthetic plastics material is injected into the mold cavity.

These control devices which have thus been described are actuated by drive means, preferably of the injection molding unit. Within the meaning of the invention, this means that the injection molding unit with the extruder worm and its movements ensures correct actuation of the control devices. In fact, according to the operating position of the injection molding unit or the disposition of the extruder worm in relation to the plasticising cylinder, so the control devices must be actuated at the right moment. These drive means can be mechanical or hydraulic pistons for at the moment of commencement of forward movement of the extruder worm in the direction of the mold cavity, the control devices must be so actuated that they maintain constant the distance between the outer and inner mold parts. When the extruder worm has reached its extreme position, i.e. when the plasticised synthetic plastics material has been injected into the mold cavity, then the control devices are again actuated in order to reduce the mold cavity. In this way, the synthetic plastics material present in the mold cavity fills the entire volume of the mold cavity, whereupon the second stage of the method is completed. Time-controlled or controlled by some other suitable means, then, the aforesaid gap between outer and inner mold parts is again increased in order to increase the volume of the mold cavity and in order to prepare the start of the first stage of the method for the next injection molding process.

According to the invention, it is furthermore expedient if the inner mold part consists of the mandrel on a mandrel wheel driven to rotate intermittently about a shaft and if the outer mold part is formed by two arms with outer mold halves and adapted to pivot about axes which extend at right-angles to the shaft of the mandrel wheel and if whatever is the smallest gap between the shaft of the mandrel wheel and the pivot axes of the arms is adjustably variable. This further development is aimed at improving package producing machines of the prior art which have intermittently rotatable mandrel wheels on which the mandrels are used as inner mold parts. If a common plane is passed through the pivot axes of the arms with the outer mold halves, then the shortest connecting line to the rotary shaft of the mandrel wheel is with this construction adjustably variably according to the teaching of the invention. The appropriate bearings can be displaced hydraulically or mechanically if the correct control signals are given.

As already briefly intimated above, in an advantageous further development of the invention, the control device may comprise spacers for varying the gap between outer and inner mold parts. Alternatively, however, it is equally possible, if according to the invention, the control device has a hydraulic and/or pneumatic piston-cylinder arrangement for varying the gap between outer and inner mold parts. This is for displacing the inner mold part in relation to the outer mold part.

According to the invention, it is particularly favorable to use an apparatus of the afore-described type for producing a package for flowable substances, consisting of side walls connected to one another like a tube via a longitudinal sealing seam and end walls mounted at the ends of the tube and which form the top and bottom of the package. It is true that any desired synthetic plastics parts can be integrally molded on the edge of thin-walled bodies consisting of paper or the like by the method according to the invention and the apparatus used for this can be manufactured technically more easily and at a more competitive price. It is particularly preferable that the two-stage method according to the invention be used however for package producing machines such as were already described in part at the outset with reference to a known construction. Liquids packages are already being produced, filled and sealed in large quantities per unit of time. The measures according to the invention simplify not only the tools, because the clamping forces which have to be applied to the mold parts can be reduced, but the machine as s whole can work with even shorter clock times. This results in an increased output and with an elimination of the disadvantage mentioned initially, so that the clock time during injection no longer represents the limit on the output of the package producing machine. Furthermore, package tops of smaller thickness yet with greater dimensional accuracy can be produced, i.e. the ratio of the thickness of the lid, reduced to 0.5 mm, in relation to the line of weakness of for example 0.15 to 0.20 mm can be accurately maintained.

Due to the reduced pressures when injecting synthetic plastics material into the mold cavity compared with the aforementioned 1000 bars pressure in prior art machines, it is now possible by applying the present invention to use only 600 bars. Therefore, smaller and even mechanically controlled and moved injection molding units can be advantageously used instead of the conventional large hydraulic equipment.

Also favorable according to the invention is the use of the apparatus for the production of package for flowable substances, the synthetic plastics top having no carrier material but comprising the pourer device while the bottom consists of paper parts which are in one piece with the side walls and is formed by folding and sealing. This very type of package is produced in large quantities and used by the end user. Therefore, it is highly desirable for this very type of package to be produced with a synthetic plastics top with a pourer device by the apparatus according to the invention and by applying the two-stage method according to the invention.

BRIEF DESCRIPTION OF THE DRAWINGS

Further advantages, features and possible applications of the present invention will emerge from the ensuing description of preferred examples of embodiment in conjunction with the attached drawings, in which.

DETAILED DESCRIPTION OF THE PREFERRED EMBODIMENTS

Figure 1:
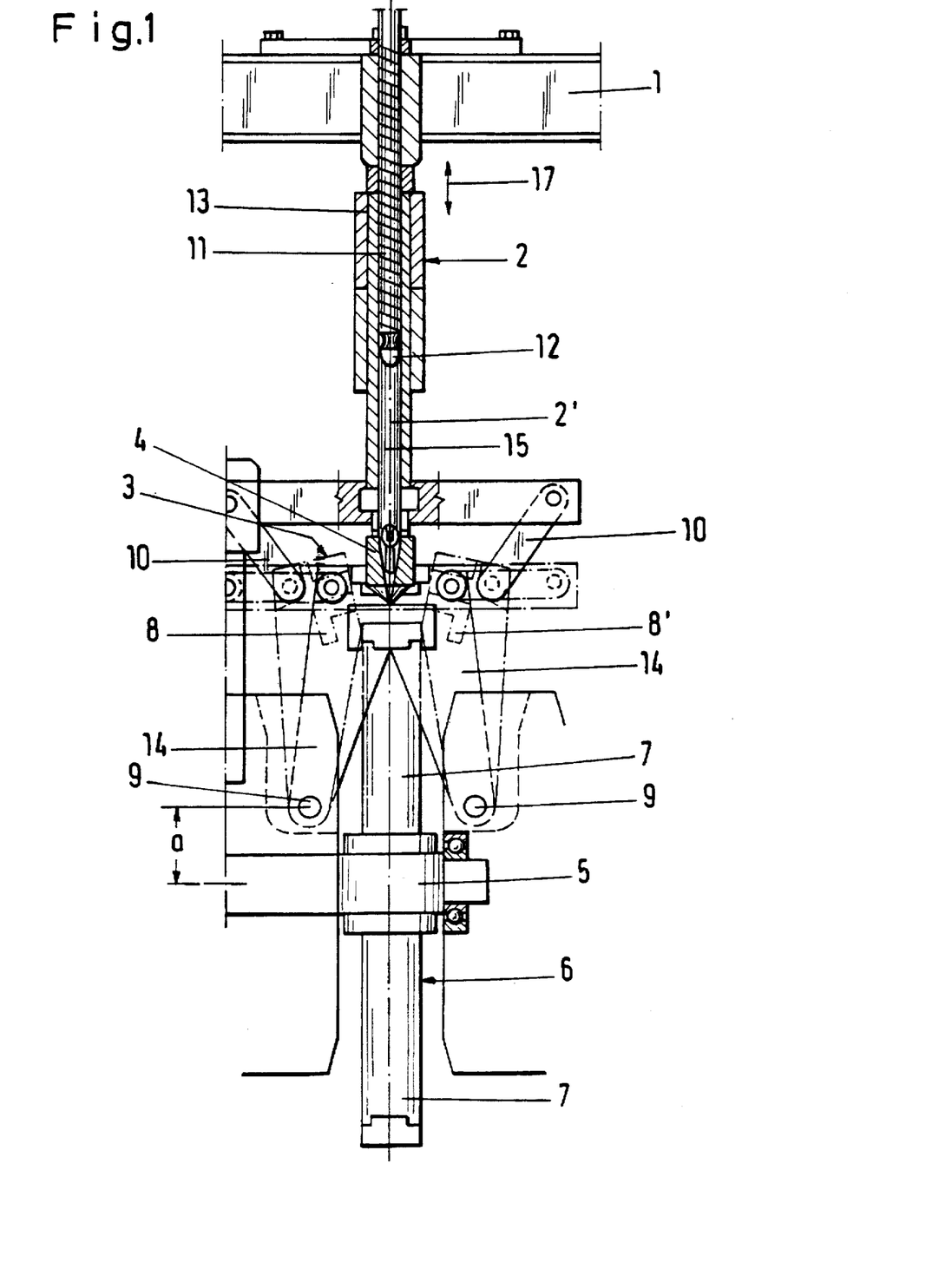
FIG. 1 shows diagrammatically and in a broken-away form a side view of an apparatus for the integral molding of a synthetic thermoplastics part on the edge of a paper tube.

FIG. 1 shows the whole integral molding apparatus. Mounted on the machine frame 1, in the upper portion, is an overall injection molding unit designated 2 at the end facing the tool generally designated 3 of which there is the nozzle 4. Due to the fixed mounting of the injection molding unit 2 on the machine frame 1, the nozzle 4 is at a clearly defined distance above the shaft 5 of a mandrel wheel 6, of which the mandrels 7 project radially and can be intermittently switched so that in each case one mandrel 7 is in the position shown in FIG. 1 under the nozzle 4 in such a way that the longitudinal axis of the mandrel 7 shown in dash-dotted lines in the middle of FIG. 1 extends vertically from the bottom upwardly and coincides with the longitudinal axis 2' of the injection molding unit 2. The actual molding cavity for the synthetic plastics part is not expressly shown in FIG. 1. It is formed on the top of the mandrel 7 by this serving as an inner mold part and the two outer mold parts 8, 8'. While the shaft 5 of the intermittently rotatable mandrel wheel 6 is disposed in the lower portion, the outer mold part consisting of the two outer mold halves 8, 8' comprises pivotable arms 14 which are adapted to pivot about axis 9 out of the position shown by dash-dotted lines in FIG. 1 and into the position shown by solid lines. The axes 9 extend at right-angles to the extension of the longitudinal axis of the shaft 5 and are disposed at a distance a from the shaft 5 of the mandrel wheel 6. This distance a between the shaft 5 and the pivot axes 9 is variable and adjustable.

The arms 14 can be pivoted into the aforementioned closed or opened positions by drive levers 10. The opened position is shown by dash-dotted lines in FIG. 1 while the closed position is shown by solid lines.

Centrally on the injection molding unit 2 is an extruder worm 11 with a point 12 at the front which faces the nozzle 4. Between the nozzle 4 and the tip 12 of the extruder worm 11 is the filling cavity 15 which is disposed inside the plasticising cylinder 13. In operation, the extruder worm 11 is adapted for movement upwards and downwards in the direction of its longitudinal axis 2' as indicated by the double-headed arrow 17, inter alia also for injecting plasticised material into the filling chamber 15.

It is necessary to differentiate between the filling chamber 15 above the nozzle 4 and the mould cavity 16. Diagrammatically, these and the two stages of the method can be seen in FIGS. 2 and 3. The outer mold parts 8, 8' are separated from each other by the injection port 18 in the mean vertical sections taken through FIGS. 2 and 3. From the nozzle 4 of the injection molding unit 2 which is not shown in FIGS. 2 and 3, plasticised synthetic material is injected in the direction of the arrow 19 into the mold cavity 16 at a pressure of 100 bars so that the part 20 of the cavity which is shown by the shading becomes filled. The distance between the bottom edge of the outer mold parts 8, 8' and the surface of the inner mold part 7 has a large value b in the first stage shown in FIG. 2 so that with constant surfaces of the mold parts which are opposite one another there is a greater initial volume. This is greater than the volume of the synthetic plastics drop injected into the space 20 which is why the area of the mold cavity 16 which is not shaded and which remains around the partial volume 20 remains empty. A man skilled in the art will understand that the synthetic plasticised material only needs to be injected at low pressure in the direction of the arrow 19, namely at around 100 bars in the case of a preferred embodiment.

Figure 2:
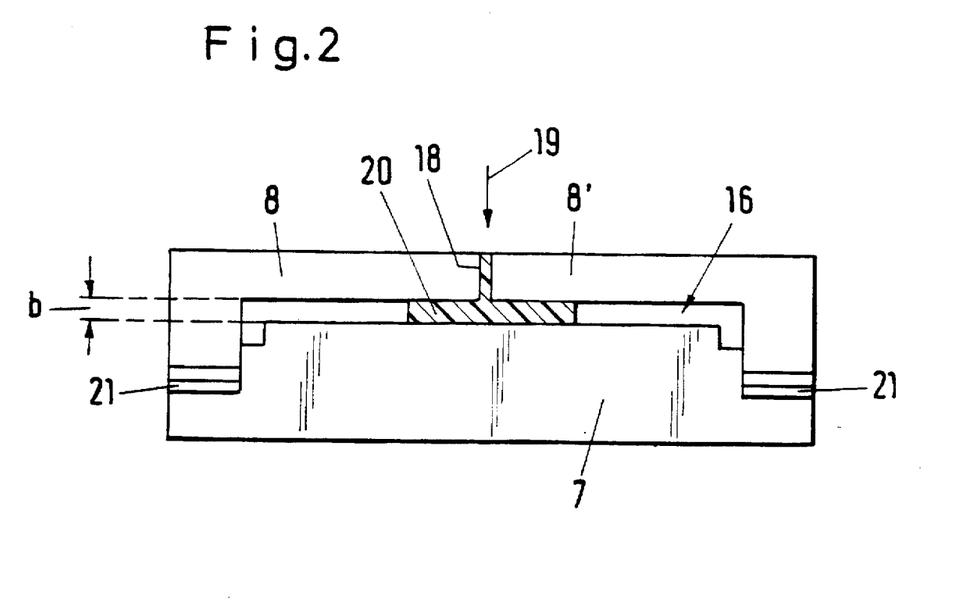
FIG. 2 shows outer and inner mold parts diagrammatically during the first stage when the mold cavity is of large volume.
Figure 3:
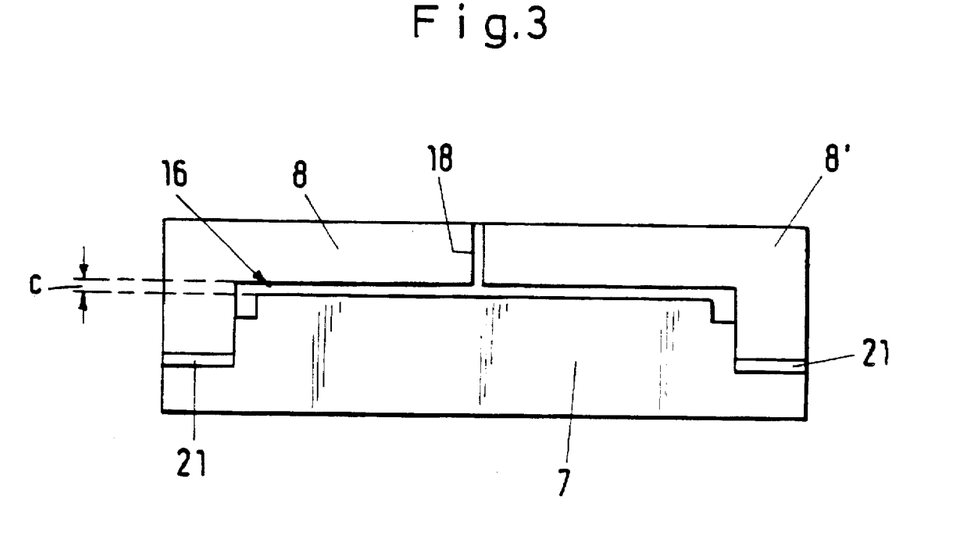
FIG. 3 is a view similar to that in FIG. 2 but where the mold cavity has a reduced volume.

If shims 21 are used as control devices, as shown in FIGS. 2 and 3, then the outer surfaces of the mold parts 7, 8, 8' do not touch, nor do the shims 21. If the mechanical drive piston which is not shown here but which is intended for the extruder worm 11 has a drive means reaches the low position in which the synthetic plastics material has filled the partial space 20 in the mold cavity 16, then a further drive is actuated (this can be reached also mechanically via cam plates and control cams), outer and inner mold parts move towards each other so that the mold cavity 16 has a smaller volume and the distance between the oppositely disposed surfaces in the mold cavity, previously designated "b" assumes a distance c such as is shown in FIG. 3.

During the second stage of the method, the mold cavity 16 therefore assumes a smaller volume, namely by the fact that the pivoting axes 9 and shaft 5 move closer together, the clamping force for pressing together the inner (7) and the outer mold parts (8, 8') being greater than the clamping force in the first stage, as it happens 100 bars in the first stage: being for example 3 tonnes in the case of the special embodiment being reviewed. The whole mold cavity 16 is filled with plasticised material at the end of stage 2, as illustrated in FIG. 3. The shims 21 bear between outer and inner mold parts and establish the gap c.

Figure 4:
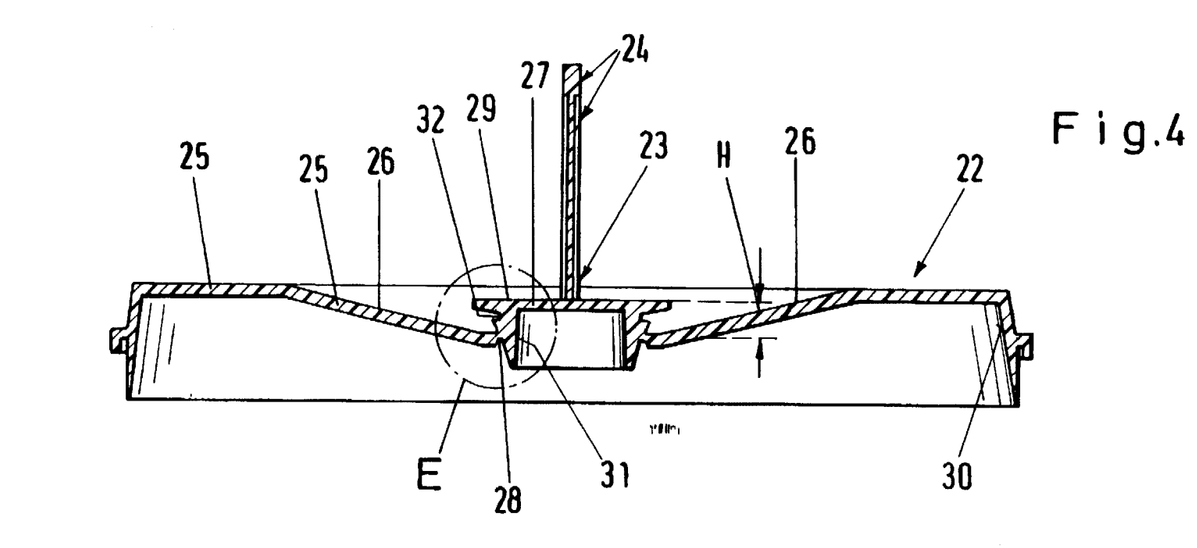
FIG. 4 is a cross-sectional view of a synthetic plastics part in the form of a pourer device
Figure 5:
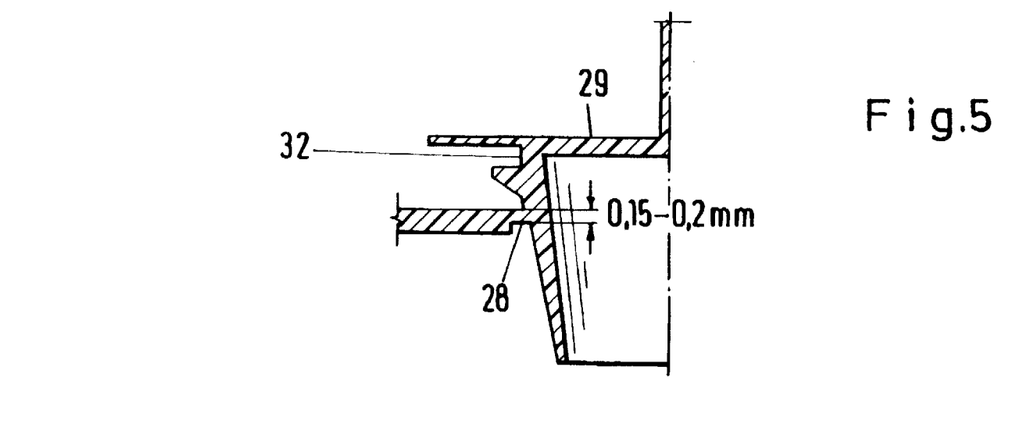
FIG. 5 is a detail of the pourer device in FIG. 4.

Whereas the mold cavity 16 is shown diagrammatically and in simplified form in FIGS. 2 and 3, in order to explain the method more clearly, FIG. 4 shows the product corresponding to the mold cavity, in this case the top 22 of a liquids package, together with a detail E which is shown in an enlarged view in FIG. 5. Centrally on one edge of the top is a pourer device generally designated 23 and also a handle 24. The surface 25 of the top 22 has outer plane and middle oblique surface, these latter being designated 26. These ensure that the opening device 23 can be disposed within the outer contours of the top 22. The withdrawable tab 27 is connected to the oblique wall 26 via a line of weakness 28 and although the surface 29 of the closure tab 27 at a distance H from the line of weakness 28 which is disposed farther towards the interior of the package is not inconsiderable, no part of the opening device 23 apart from the handle 24 extends out of the outer contours of the top 22. Via a shoulder 30, the top can be integrally molded onto the (not shown) tube of the package. If the user wishes to open the package, then he pulls the handle 24 and so tears the closure tab 27 upwardly in that the line of weakness 28 which is enlarged in FIG. 5 and which is between 0.15 and 0.20 mm thick, is torn open. The collar 31 of the closure tab may be pulled fully out of the resultant pourer orifice. A groove 32 is used for reclosing the aperture subsequently.

The top wall 25 has a thickness which in the case of prior art packages is around 0.65 mm. FIG. 5 shows that the thickness of the product in the region of the line of weakness 28 is substantially smaller, namely about 0.15 to 0.2 mm so that the tearing open process functions at any time as desired but is nevertheless reliably fluid-tight prior to being torn open.

Figure 6:
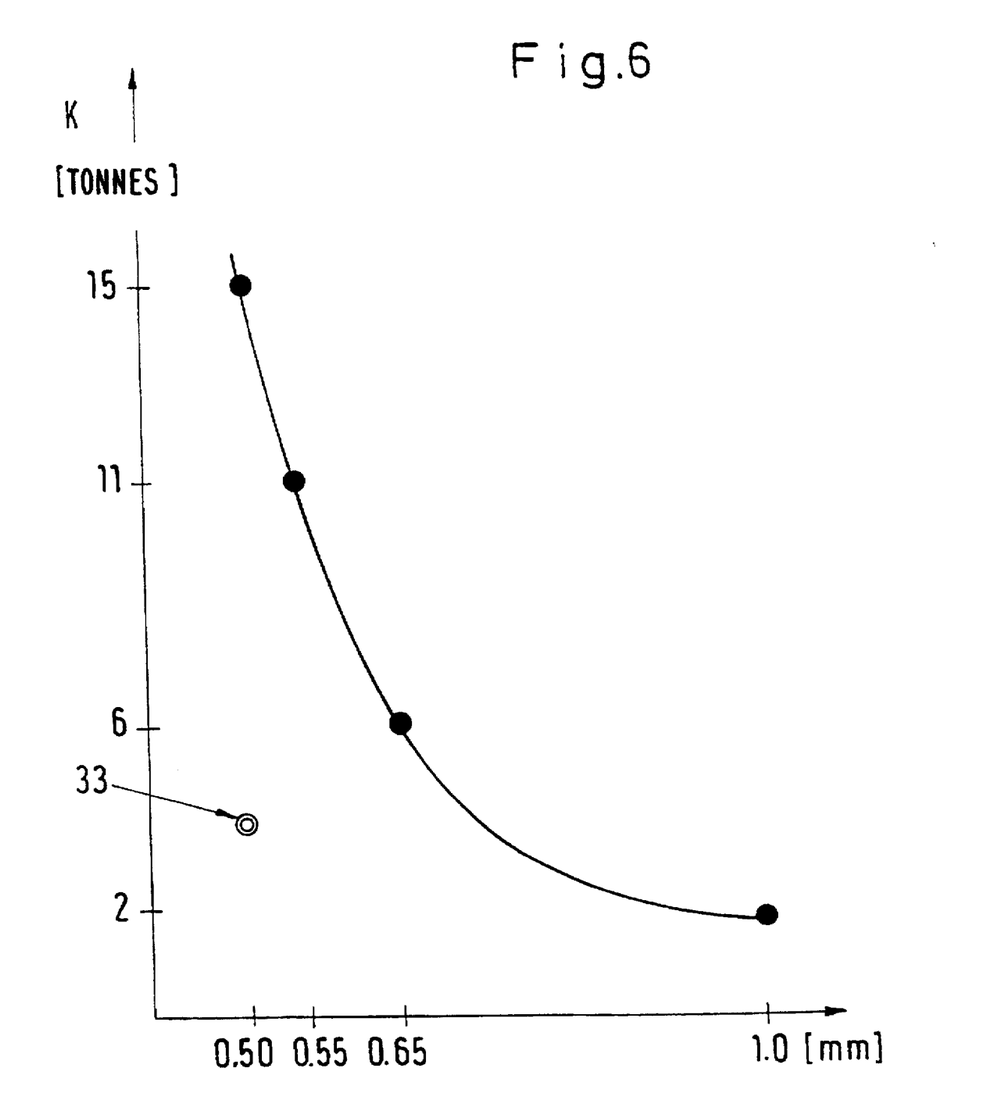
FIG. 6 is a graph showing the relationship between the clamping forces for holding together the mold parts on the one hand and the thickness of the integrally molded synthetic plastics part (abscissa) on the other and FIG. 7 is a diagram of a curve showing the relationship between the necessary cooling times and the thickness of the injection molded synthetic plastics part.

FIG. 6 shows the aforementioned thickness of the top wall 25 plotted in relation to the clamping force K. For an example, if it is assumed that 6 g of synthetic plastics material is required to fill the mold cavity 16 and if the mold cavity is kept closed, for example in the situation shown in FIG. 3, then it will be understood that with a slight opening of the mold cavity, i.e. as the gap c becomes larger, so the pressure of the injected synthetic plastics material in the mold cavity becomes considerably lower. Consequently, there is also a drop in the clamping force with which the mold parts are pressed together. If we now follow the curve in FIG. 6 on the abscissa from left to right, then firstly the top-most left-hand spot is observed at which a clamping force of 15 tonnes is required if the thickness c between outer and inner mold parts amounts to only 0.5 mm. Understandably, in practice and in current operation of a package producing machine, such a clamping force could not be sought nor feasible in the attainment of such a thin top. Deformations and thus enlargements of the mold cavity on the other hand resulted in lower clamping forces which is why in practice it was always the third point from the left which was a taken, i.e. a top with a thickness of the walls 25 of the order of c=0.65 mm was produced. For this, clamping forces for the tools of around 6 tonnes were needed. If, now, we look at the double-circle point 33, which is attainable by the method described here and by the desired effect and the advantages. Therefore, it is possible to achieve a thickness c of the top wall 25 of only 0.5 mm, even though the clamping force amounts to only about 3 tonnes. Naturally, a graph drawn through this point 33 will look more favourable.

Figure 7:
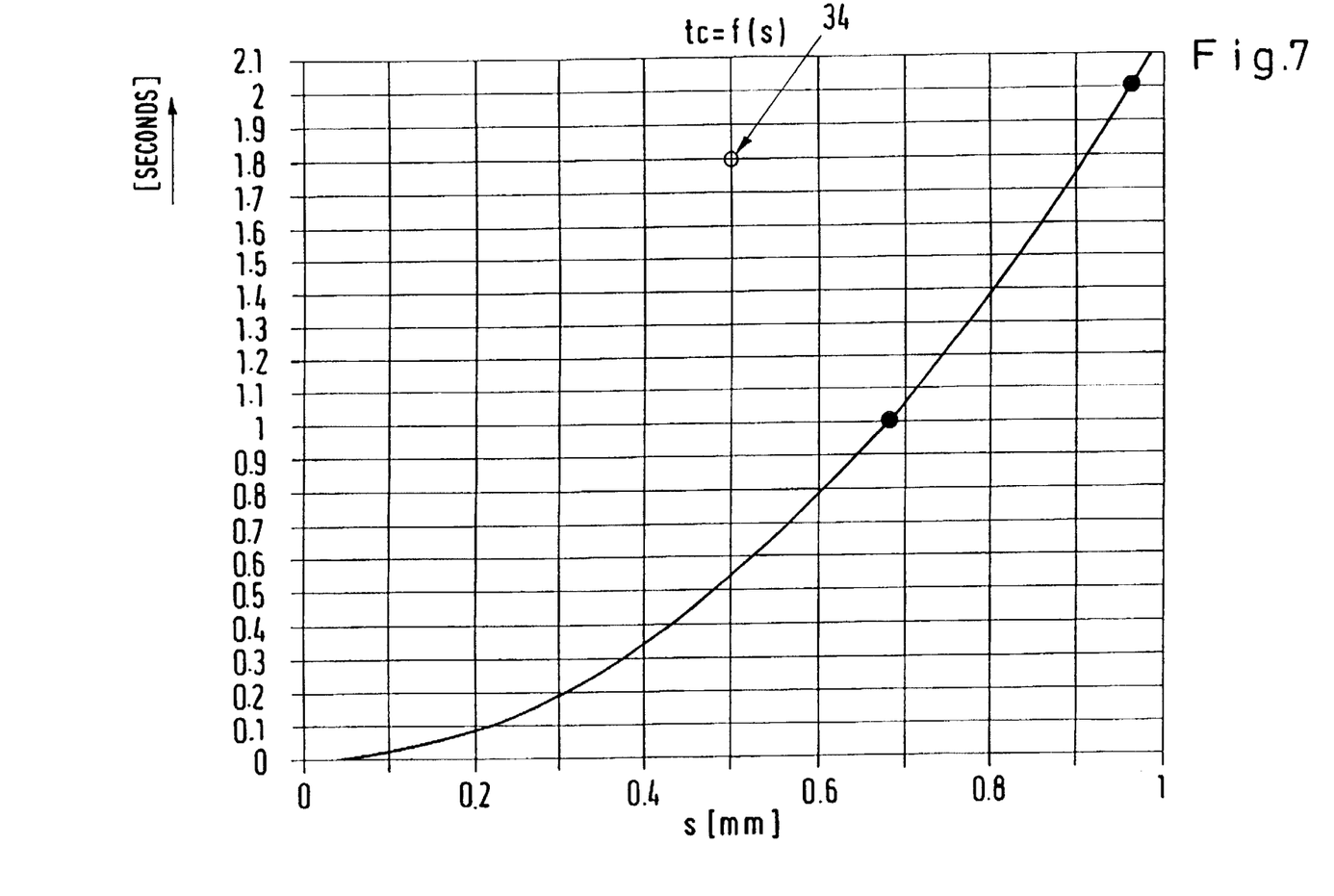

Finally, it is interesting to examine FIG. 7 with the graphs, in which the abscissa the thickness of the top is shown in millimeters while on the ordinates the time for hardening out the synthetic plastics material is also plotted, and indicates the time after which inner and outer mold parts can be opened. With a top thickness of about 0.68 mm, cooling by conventional methods takes about 1 second. If it were desired to achieve a thickness of only 0.5 mm in the top wall 25, then only 0.5 seconds of cooling time would be available. With previous production methods, this was unattainable. If, now, we look at the point 34 in FIG. 7, then a man skilled in the art will immediately recognize the unexpected effect of the above-described measures and the advantages. For a thickness of 0.5 mm, 1.8 seconds are currently available for cooling purposes.

I claim:

1. A method of injection molding a thermoplastic member on an edge of a thin-walled body consisting of a member selected from the group consisting of paper, cardboard, and synthetic plastic coated paper comprising the steps of:

a) providing a mandrel wheel having a plurality of adjacent mandrels projecting radially therefrom, said mandrels each comprising an inner mold part, the mandrel wheel being provided to rotate on a shaft about an axis;

b) providing a pair of outer mold parts which are swingably carried on arms which are disposed to pivot about axes which extend at right angles to said axis of said shaft of said mandrel wheel;

c) providing a thin-walled body on each of said adjacent mandrels;

d) providing an injection molding unit having an injection nozzle with injection means;

e) intermittently rotating said mandrel wheel to bring one of said adjacent mandrels having a thin walled body thereon into position under said injection nozzle;

f) forming a mold cavity by applying a clamping force and bringing together said outer mold parts with said inner mold part of said one of said adjacent mandrels to form a mold cavity;

g) maintaining said mold cavity at a first initial volume;

h) injecting into said mold cavity with said injection nozzle, a total amount of synthetic plasticized material necessary to form the thermoplastic member;

i) pressing the mold parts together by increasing the clamping force;

j) providing drive means connecting said outer mold parts with said injection molding unit;

k) wherein the step of forming a mold cavity includes the step of actuating the drive means and moving the nozzle of the injection molding unit in the direction of the mold cavity;

l) wherein the step of pressing the mold parts together includes the step of actuating the drive means and reducing the volume of the mold cavity so that synthetic plastics material present in the mold cavity fills the entire volume of the mold cavity.

* * * * *